United States Patent [19]
Newland, Jr.

[11] Patent Number: 6,006,198
[45] Date of Patent: Dec. 21, 1999

[54] SYSTEM AND METHOD FOR DETECTING MERCHANDISE SLIDING AND UNDER RINGING AT CASH REGISTER

[76] Inventor: Ross G. Newland, Jr., 105 Indian Trail, Anderson, S.C. 29625

[21] Appl. No.: 09/027,392

[22] Filed: Feb. 20, 1998

[51] Int. Cl.$^6$ .............................. G06F 1/14; G06F 17/18
[52] U.S. Cl. ............................... 705/21; 705/22; 705/28; 705/29
[58] Field of Search ...................... 235/7 R; 705/21–22, 705/28–29; 186/59, 61

[56] References Cited

U.S. PATENT DOCUMENTS

| | | | |
|---|---|---|---|
| 4,000,488 | 12/1976 | Ephraim | 340/568.2 |
| 4,336,531 | 6/1982 | Kincaid | 340/540 |
| 4,471,344 | 9/1984 | Williams | 340/572.2 |
| 4,502,120 | 2/1985 | Ohnishi et al. | 705/21 |
| 4,652,863 | 3/1987 | Hultman | 340/551 |
| 4,694,283 | 9/1987 | Reeb | 340/572.5 |
| 4,724,426 | 2/1988 | Lundberg | 340/551 |
| 4,725,949 | 2/1988 | Dreher | 705/24 |
| 4,812,811 | 3/1989 | Asbrink et al. | 340/571 |
| 4,835,524 | 5/1989 | Lamond et al. | 340/572.3 |
| 4,920,335 | 4/1990 | Andrews | 340/572.3 |
| 4,945,217 | 7/1990 | Bolan | 235/472.03 |
| 4,948,954 | 8/1990 | Dias | 235/441 |
| 5,189,607 | 2/1993 | Shirasaki et al. | 705/21 |
| 5,635,906 | 6/1997 | Joseph | 340/572.3 |
| 5,671,362 | 9/1997 | Cowe et al. | 705/28 |
| 5,745,036 | 4/1998 | Clare | 340/572.1 |
| 5,756,977 | 5/1998 | Biss | 235/7 R |

FOREIGN PATENT DOCUMENTS

| | | | |
|---|---|---|---|
| 0267614 A2 | 5/1988 | European Pat. Off. | G07G 1/14 |
| 2176921 | 1/1987 | United Kingdom | G06F 15/16 |
| 2181326 | 4/1987 | United Kingdom | G08B 13/24 |
| 90/05968 | 5/1990 | WIPO | G08B 13/14 |

OTHER PUBLICATIONS

"When theft is an inside job", James D. Walls; Security Management, Apr. 1989.
"Electronic Price Labels—Ready for takeoff?", from Supermarket News, New York, Jun. 1989.
"The debut of IT's RF/ID technology", Kevin R. Sharp, ID systems Nov., 1990.
"An RF/ID Primer", Dave Draxler, ID Systems Jun. 1990.
"RF/ID: Meeting industry's needs in harsh environments", Russ Adams, Automatic ID News Aug., 1990.
"Tagscan electronic identification and inventory control system" by Advanced Systems Research Pty. Ltd. NSW, Australia, Nov. 1987.

*Primary Examiner*—James P. Trammell
*Assistant Examiner*—Cuong H. Nguyen
*Attorney, Agent, or Firm*—Cort Flint

[57] ABSTRACT

A system and method for detecting the under ringing and/or sliding of merchandise by a cashier in a retail establishment is disclosed including the use of a system employing many cash registers and cashiers. The cash register system compiles raw cash register data which includes total items sold and dollar sales of the items sold by each cashier on each day a cashier works. A cash register database stores the cash register data in a medium for processing on a central computer. A computer program including instruction for averaging data is embodied in computer-readable forms to determine a daily average price of the items sold by each cashier per cashier day and a store average item price representing the average of all cashier average item prices of all qualifying cashiers during a specified period. A cashier database is generated which includes the daily cashier average item prices. Comparative instructions analyze the daily cashier average item price for each cashier and the store average item price to determine a daily deviation of each cashier from the store average item price, and for calculating a total cashier deviation for each cashier by algebraic summing of the daily deviations of each cashier. Generating a report to identify a cashier deviation which is statistically significantly different from other cashiers.

36 Claims, 6 Drawing Sheets

SYSTEM AND METHOD FOR DETECTING MERCHANDISE SLIDING AND UNDER RINGING AT CASH REGISTER

BACKGROUND OF THE INVENTION

This invention relates to cashier exception report information systems for retail establishments, and more particularly, to a method and system for detecting merchandise under ringing and sliding by cashiers in retail establishments employing electronic cash register systems.

Typical electronic cash register data collection systems are disclosed in U.S. Pat. Nos. 5,189,607 and 4,502,120 which collect cash register data from a plurality of electronic cash registers at which cashiers are employed. Previously, exception report information systems for retail establishment have been known which used the electronically collected cash register data, and calculate the average transaction price for each cashier. Exception reports are then generated comparing the average transaction price by cashier. Additionally, the average transaction price is commonly calculated by store in a chain of stores. The exception report details any deviation of a cashier and/or a store beyond a normal deviation. The average transaction price for the individual cashiers is averaged to provide an average store transaction price. The individual cashier transaction prices are then compared to the store average. Any cashier who deviates more than 30% from the store average is suspect. This will identify a cashier who possibly is under ringing merchandise. Suspected under ringing can then be readily proven by an audit. However, the problem arises in that analysis of the average transaction price for the cashier does not take into effect the differences in the days and shifts which the cashiers work. The average transaction price may vary itself on the particular day and time of purchase. Also, the prior systems have not been satisfactory in detecting the sliding of merchandise. The sliding of merchandise means that the cashier passes merchandise through the checkout without ringing a price. When merchandise bypasses the cash register, there is no paper audit trail.

Accordingly, an object of the present invention is to provide a method and system for detecting the under ringing and/or sliding of merchandise by cashiers at a retail establishment in an effective and reliable manner. In particular, an object of the invention is to eliminate the variances in the average transaction price of cashiers caused by time and shift differences to more reliably detect merchandise under ringing, and to provide a method and system for detecting the sliding of merchandise.

SUMMARY OF THE INVENTION

The above objectives are accomplished according to the present invention by providing a computerized process for detecting the under ringing and/or sliding of merchandise by a cashier in an electronic cash register system employing a plurality of electronic cash registers and a cashier at each cash register. Cash register data which includes the total number of items and dollar amount for all items sold by each cashier for each cashier day is compiled into a database that is input and stored in a computer readable memory. Next, the cash register data is processed on the computer to determine a daily cashier average item price for each cashier which represents the average price of the items sold by a respective cashier on each cashier day. Advantageously, the cashier data to be processed on the computer is selected according to predetermined criteria which includes selecting the cashier data of cashiers who have a minimum number of customers and/or cashier days. The cashier average item price is indexed to a respective cashier and stored in a cashier database in a computer-readable medium. Next, the cash register data is processed to determine the store average item price representing the daily average price of all the items sold by all the cashiers during a specified time period. The daily cashier average item price is compared to the store average item price for each cashier to compute the daily deviation of each cashier from the store average item price. The method then includes computing a cashier deviation for each cashier by algebraically summing the daily deviations of each cashier, and determining if a cashier deviation of an individual cashier is statistically significantly different from the cashier deviation of the other cashiers so that the individual cashier can be identified for further investigation. Advantageously, the method includes determining the daily cashier average item price for each cashier day of the cashiers during a specified time period in a range of about 30 to 90 days. Preferably the specified period of time is approximately 60 days. Finally, the method contemplates displaying the cashier deviation of the cashiers by generating a report on the computer, preferably by generating a graph containing a plot of the cashier deviation of each cashier against the store average item price. The graph is based on a deviation from the store average item price as a zero base line, and printed on a computer associated printer.

A paper audit of any cashier whose cashier deviation indicates under ringing is conducted to substantiate the under ringing. In particular, if another cashier exists whose cashier deviation indicates merchandise sliding, a conclusion can be reached that merchandise sliding is unlikely by the other cashier if the audit trail of the first cashier substantiates under ringing. The cashier whose cashier deviation indicate merchandise sliding is further investigated if the audit trail does not substantiate under ringing by the first cashier.

In accordance with further aspects of the invention, a computerized system is provided for detecting the under ringing and sliding of merchandise by a cashier in a retail establishment. A cash register database stores the cash register data in a computer-readable medium, and a central computer processes the cash register data. Averaging instructions are embodied in computer-readable form for processing the cash register data on the computer to determine the daily cashier average item price. The store average item price is also computed representing the average item price of the items sold by all of the cashiers during a specified time period. A cashier database is created which includes the daily cashier average item prices stored in a computer-readable medium indexed to the corresponding cashiers. Comparative instructions embodied in computer-readable codes process the cashier database on the computer to determine a daily deviation for each cashier from the store average item price. In an important aspect of the invention, the instructions calculate a cashier deviation for each cashier by algebraically summing the daily deviations of each cashier during a specified time period. The system includes selection instructions embodied in computer-readable media for selecting said cashier data from the cashier database to be processed on said computer according to predetermined selection criteria. Preferably, the selection criteria includes selecting the cashier data of only cashiers who had a minimum number of customers per cashier day during the specified time period. Means embodied in computer-readable codes is provided for generating a report identifying any cashier whose cashier deviation is statistically significantly different from the other cashiers so that the individual cashier can be further investigated.

Preferably, the averaging instructions include means embodied in computer-readable code for determining the daily cashier average item price by dividing the total dollar sales by the number of items sold by each cashier per cashier day. The averaging instructions include means embodied in computer-readable code for determining said store average item price by adding all cashier average item price for each qualifying and selected cashier and dividing the sum by the number of cashier days (i.e. total number of entries) during the specified time period. Advantageously, the specified time period is in a range of about 30 to 90 days, and preferably is approximately 60 days. The averaging instructions determine the daily cashier average item price for each cashier day of each cashier during the specified time period.

According to a further aspect of the invention, a computer program is provided for use in an electronic cash register system to detect the under ringing and sliding of merchandise by a cashier, as described previously. The computer program includes processing instructions embodied in computer-readable code which includes the selection instructions, averaging instructions, and comparative instructions stored in a computer-readable medium. The selection instructions provide criteria for selecting the cashier data to be processed such as those with a minimum number of cashier days and/or customers necessary for valid results. The averaging instructions process the cash register data to calculate the daily cashier average item price and the store average item price, and create a cashier database in which the cashier average item prices are indexed and stored in a computer-readable medium. The comparative instructions analyze and compare the daily cashier average item price and the store average item price data to calculate the daily deviation of each cashier, and calculate a cashier deviation for each cashier by algebraically summing the daily deviations of a cashier. The instructions also compute a report if a cashier deviation of an individual cashier is significantly different from the other cashiers.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A DETAILED EMBODIMENT

Figure 1:
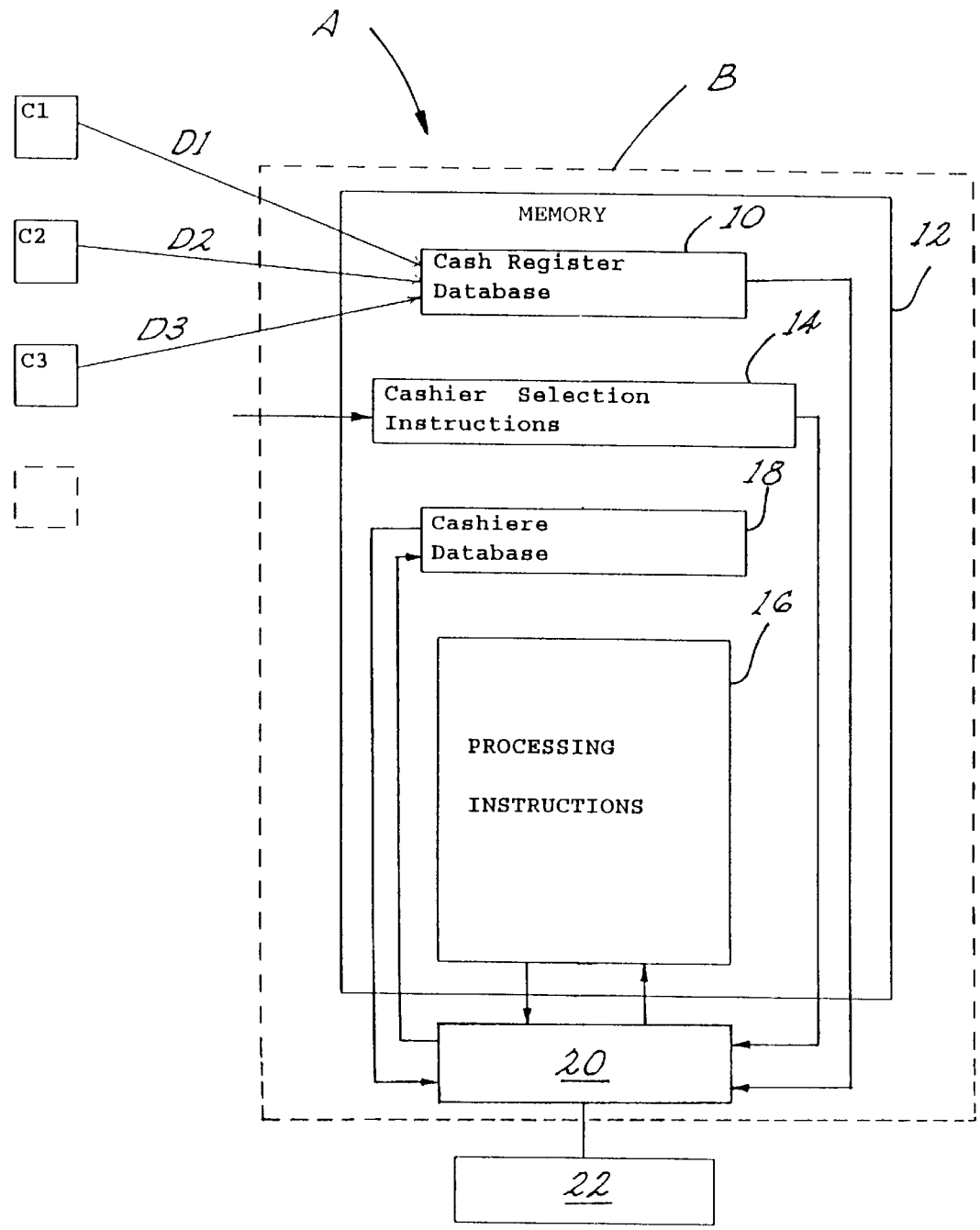
FIG. 1 is a schematic diagram illustrating a system and method according to the present invention for detecting the under ringing and sliding of merchandise at a retail establishment.

Referring now to the drawings, the invention will now be described in more detail. As can best be seen in FIG. 1, a computerized system for detecting under ringing and/or sliding of merchandise by a cashier in a retail establishment, designated generally as A, is illustrated which includes an electronic cash register system employing a plurality of electronic cash registers C1, C2, C3 . . . and a cashier employed at each cash register. The cash register system compiles raw data D1, D2, D3 . . . which includes a total number of items sold and a total dollar sales of the items sold by each cashier on each cashier day a cashier works in the system. The cash register data is input to a central computer B and stored in a cash register data base 10 created in a computer readable memory 12 of the computer.

Selection instructions 14 are embodied in computer-readable code stored in memory 12 for selecting which cashier and cash register data qualifies for analysis and processing. General processing instructions 16 embodied computer-readable code are also stored in a computer-readable medium such as memory 12 and include averaging and comparative instructions for processing the selected cash register data, creating a cashier database 18, and analyzing the cashier data for identifying merchandise under ringing and/or sliding. Cashier database 18 contains the desired, calculated data for only those cashiers meeting the selection criteria of instructions 14. Computer D includes a control processing unit 20 (CPU) for processing instructions 14 and 16. An exception report 22 is output from the computer based on cashier data 18.

Figure 2:
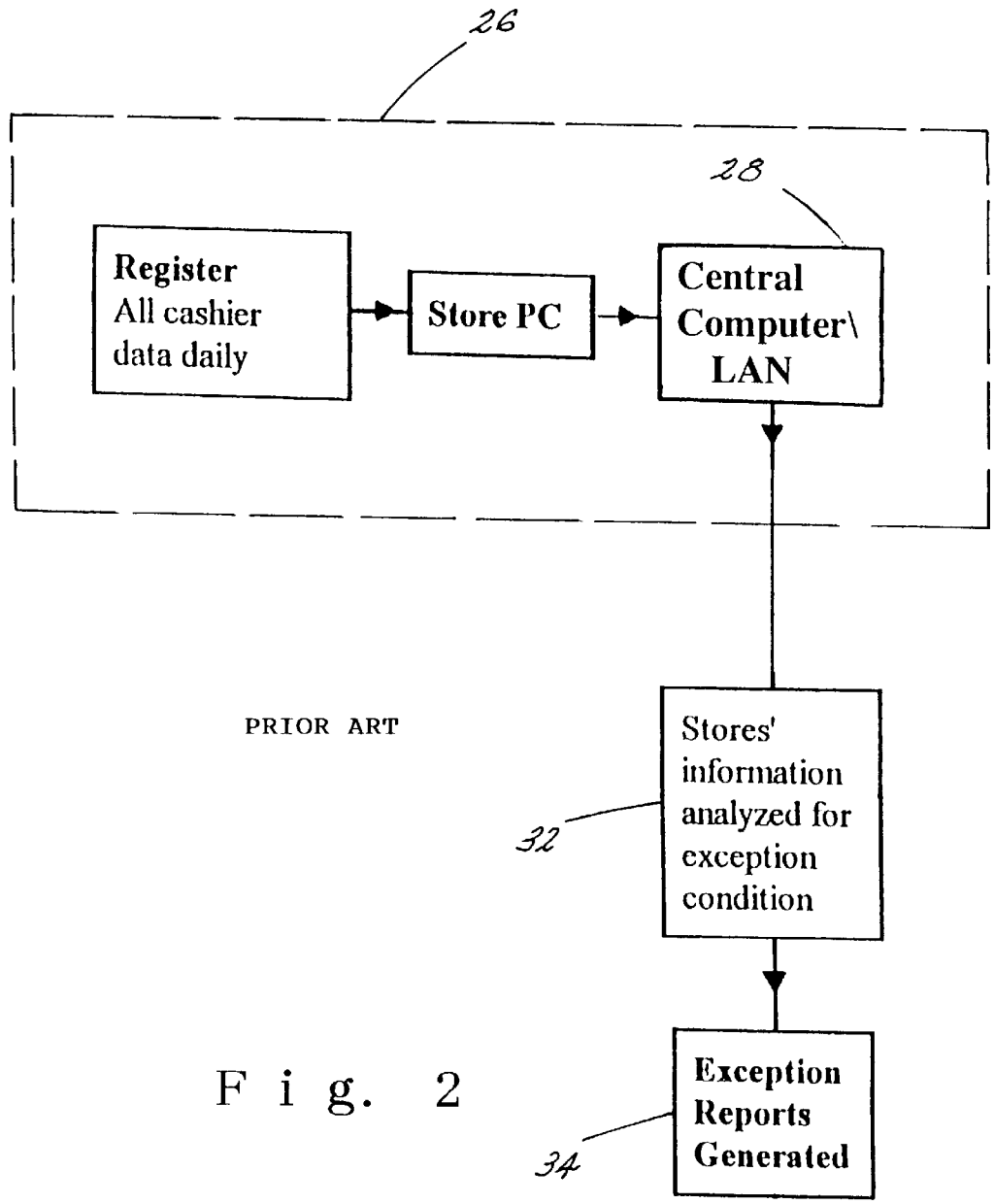
FIG. 2 is a flow diagram illustrating a typical prior art exception report information system.

FIG. 2 illustrates a flowchart of a typical prior art electronic cash register system 26 wherein all sales transactions by a cashier are recorded and sent to a computer or local area network 28 where the information is stored in a cash register database 30. Criteria for a store exception condition is set up at 32 such as time frames, amounts, percent, variation, etc. The store information is analyzed for an exception condition at 32, taking the store information, comparing the norm and seeing if there is an exception condition. Each category is examined for exceptions (company average or store average is examined for the exception conditions). Numerous exception conditions can be examined as determined by managerial selection. Once a store reaches an exception condition, for example, if there are 10 convenient stores and one store has refunds that are 2% greater then the average of all the stores, an exception report is generated at 34 pointing out that the store's refunds are 2% greater then the norm. An exception report is then generated in the form of tables. The exception report tables are transmitted to management for further investigation. Once a potential problem is identified, investigators are sent in to determine if a of theft or policy violations are occurring. Average transaction prices are also typically calculated with exception reports generated when an exception condition is calculated such as a cashier with a greater than 30% deviation from the average store transaction price.

Figure 3:
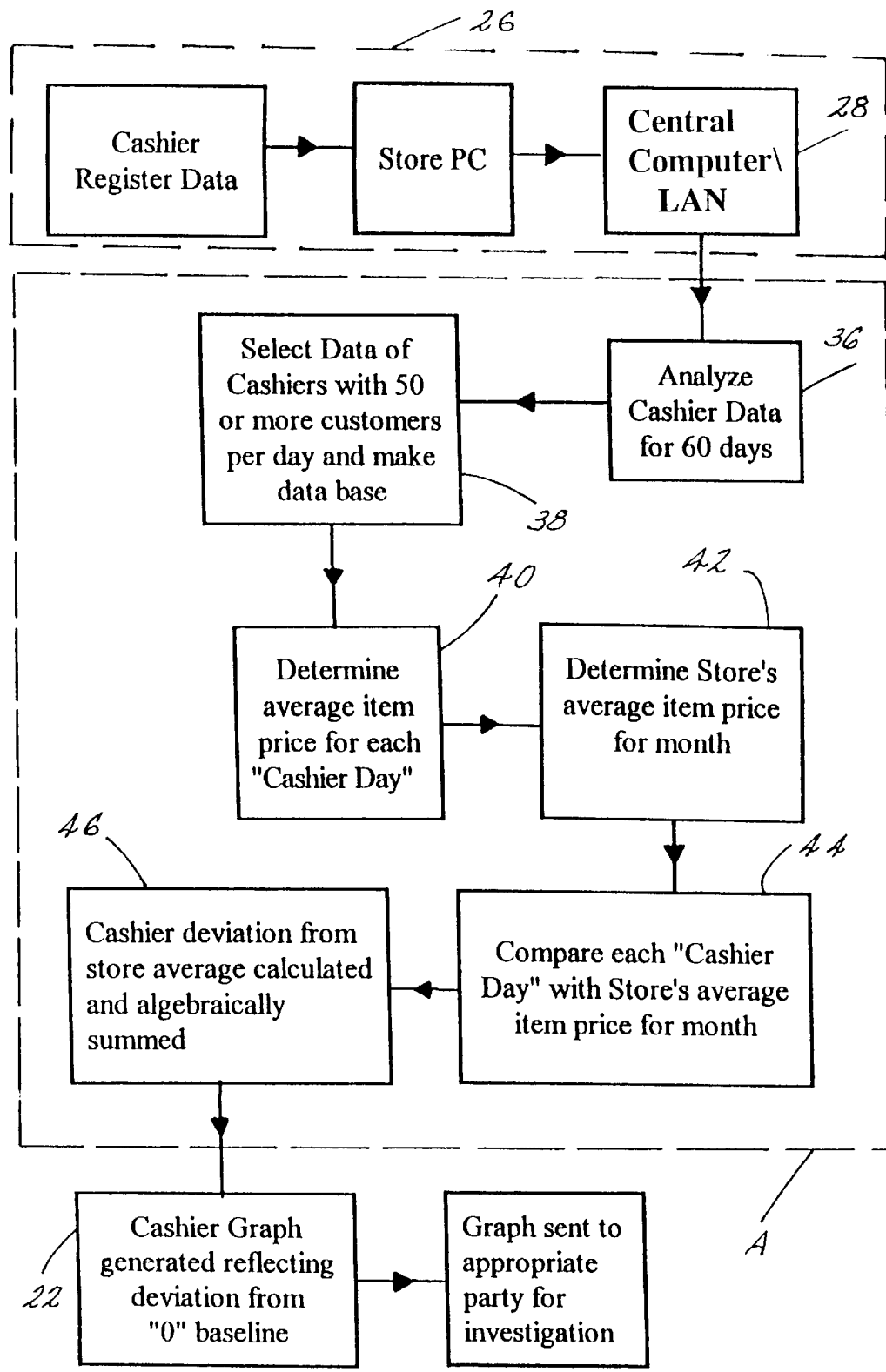
FIG. 3 is a flow diagram illustrating in more detail a method and system according to the invention for detecting the under ringing and sliding of merchandise by cashiers in retail establishments.

FIG. 3 illustrates a system and method of the present invention for detecting merchandise under ringing and/or sliding by a cashier employed in an electronic cash register system. In accordance with the present invention, the cash register data D1, D2, D3 . . . stored in cash register data base 10 is analyzed for a period of between 30 and 90 days, and is preferably 60 days as indicated at 36. The cash register data is processed by the central processing unit 20 of computer B in accordance with cashier selection instructions 14 to select the cash register data of only the cashiers who meet the selection criteria 38. For example, in the illustrated embodiment, it is desired to select the cash register data of only cashiers with 50 or more customers per cashier day for analyses as indicated at 38. Of course, the minimum number of cashiers per day which is used as a selection criteria, as well as the selection criteria itself, can change depending on the application being made, the average volume of the store, etc. The cashier data selection instructions are processed along with the cash register data D1, D2, D3 . . . from data base 10 in accordance with processing instructions 16 to generate cashier database 18. Processing instructions 16 include averaging instructions for calculating the daily average item price at 40 for each cashier for each cashier day. This is determined by dividing the sales of all items sold by each cashier by the total number of items sold by the cashier per day. The daily average item price for each cashier is then stored in cashier database 18. In addition, the averaging instructions provide for determining the store average item price for a specified period of time, such as one month, at 42. The daily average item prices for the cashiers during the time period are averaged, i.e., adding all the daily cashier average item prices together during the time period, and dividing by the total number of cashier days during the period, e.g. all the qualifying cashier days in the database. In calculating the cashier average item price per cashier day, pay outs and refunds are subtracted from the total sales revenue before calculating the average. Instructions 16 also include comparative instructions for comparing the cashier average item price for each cashier per cashier day to the store average item price for the time period to calculate a daily deviation for each cashier at 44. Most important, the instructions include steps for determining a total cashier deviation by algebraically summing the daily deviations of each cashier at 46. The above described instructions can be provided by a computer program embodied in computer readable code for carrying out the above instructions, determinations, and calculations. The provision of a suitable computer program is well within the purview of one skilled in the programming art having been taught the aspects and expedients of the present invention. The program also provides means embodied in computer-readable code for generating a cashier graph, or other report, at 22 when an exception condition is detected. The cashier graph may then be sent to the managerial personnel for evaluation and identification of any potentially problematic cashier.

In accordance with a computerized process of the present invention, referring to FIG. 3, data of cashiers with 50 or more customers per day are selected at 38. Next, the cashier average item price for each cashier and cashier day is determined at 40. The store average item price over a desired time period is determined at 42. The cashier average item price for each cashier day is then compared to the store average item price for the period at 44. Comparison is done for each cashier day that cashier data exists in the cashier data base. A daily deviation for each qualifying and selected cashier day is then calculated at 44. Next, the cashier deviation for each cashier during the time period is then calculated by algebraically summing the daily deviations for each cashier at 46. The cashier graph is then generated at 22 which plots the cashier deviations for the time period against the store average item price as a zero base line.

An example of a cashier data base, and cashier graph, and analyses will now be given. The tables set forth below show cashier data from cashier database 10 for store #2103.

| CASHIER DATABASE - Store #2103 | | | | | | | |
|---|---|---|---|---|---|---|---|
| Store (50) | Date (52) | Cashier (54) | Net (56) | Aver Item (58) | Dev $ (60) | Cust # (62) | Aver Tran (64) |
| 02103 | 011497 | 101 | $958.46 | $1.60 | $0.14 | 124 | $ 7.72 |
| 02103 | 011597 | 101 | $850.75 | $1.44 | ($0.02) | 115 | $ 7.39 |
| 02103 | 011897 | 101 | $1,118.17 | $1.72 | $0.26 | 119 | $ 9.39 |
| 02103 | 012597 | 101 | $1,172.34 | $1.61 | $0.15 | 179 | $ 6.54 |
| 02103 | 012797 | 101 | $586.45 | $1.46 | $0.00 | 105 | $ 5.58 |
| 02103 | 013197 | 101 | $923.83 | $1.52 | $0.06 | 102 | $ 9.05 |
| 02103 | 020597 | 101 | $680.50 | $1.45 | ($0.01) | 96 | $ 7.08 |
| 02103 | 020797 | 101 | $984.27 | $1.59 | $0.13 | 124 | $ 7.93 |
| 02103 | 021297 | 101 | $579.14 | $1.23 | ($0.23) | 124 | $ 4.67 |
| 02103 | 021597 | 101 | $1,177.00 | $1.49 | $0.03 | 150 | $ 7.84 |
| 02103 | 021897 | 101 | $774.72 | $1.36 | ($0.10) | 124 | $ 6.24 |
| 02103 | 022297 | 101 | $974.18 | $1.60 | $0.14 | 164 | $ 5.97 |
| 02103 | 022697 | 101 | $757.80 | $1.27 | ($0.19) | 120 | $ 6.31 |
| 02103 | 030197 | 101 | $1,224.88 | $1.46 | $0.00 | 149 | $ 8.27 |
| 02103 | 030497 | 101 | $666.28 | $1.45 | ($0.01) | 110 | $ 6.05 |
| 02103 | 031197 | 101 | $418.65 | $1.28 | ($0.18) | 93 | $ 4.50 |
| 02103 | 031297 | 101 | $705.02 | $1.44 | ($0.02) | 122 | $ 5.77 |
| 02103 | 031897 | 101 | $677.45 | $1.50 | $0.04 | 128 | $ 5.29 |
| 02103 | 031997 | 101 | $693.48 | $1.35 | ($0.11) | 118 | $ 5.87 |
| 02103 | 032297 | 101 | $1,197.66 | $1.24 | ($0.22) | 177 | $ 6.76 |
| | | | | | ($0.14) | | |
| 02103 | 013197 | 106 | $399.86 | $1.30 | ($0.16) | 57 | $ 7.54 |
| 02103 | 020297 | 106 | $386.48 | $1.59 | $0.13 | 57 | $ 7.02 |
| 02103 | 021397 | 106 | $1,224.96 | $1.44 | ($0.02) | 154 | $ 7.95 |
| | | | | | ($0.05) | | |
| 02103 | 011597 | 109 | $698.77 | $1.62 | $0.16 | 70 | $ 9.98 |
| 02103 | 011797 | 109 | $1,401.13 | $1.47 | $0.01 | 157 | $ 8.92 |
| 02103 | 012097 | 109 | $663.18 | $1.53 | $0.07 | 86 | $ 7.71 |
| 02103 | 012197 | 109 | $548.08 | $1.46 | $0.00 | 76 | $ 7.21 |
| 02103 | 012397 | 109 | $451.35 | $1.34 | ($0.12) | 86 | $ 5.24 |
| 02103 | 012597 | 109 | $1,249.41 | $1.49 | $0.03 | 153 | $ 8.16 |
| 02103 | 012897 | 109 | $595.22 | $1.28 | ($0.18) | 87 | $ 6.84 |
| 02103 | 012997 | 109 | $925.98 | $1.56 | $0.10 | 127 | $ 7.29 |
| 02103 | 013097 | 109 | $822.95 | $1.42 | ($0.04) | 114 | $ 7.21 |
| 02103 | 020197 | 109 | $1,417.90 | $1.48 | $0.02 | 139 | $10.20 |
| 02103 | 020497 | 109 | $917.49 | $1.37 | ($0.09) | 123 | $ 7.45 |
| 02103 | 020697 | 109 | $798.14 | $1.37 | ($0.09) | 113 | $ 7.06 |

-continued

CASHIER DATABASE - Store #2103

| Store (50) | Date (52) | Cashier (54) | Net (56) | Aver Item (58) | Dev $ (60) | Cust # (62) | Aver Tran (64) |
|---|---|---|---|---|---|---|---|
| 02103 | 020897 | 109 | $2,203.44 | $1.48 | $ 0.02 | 288 | $ 7.65 |
| 02103 | D21197 | 109 | $677.85 | $1.41 | ($ 0.05) | 101 | $ 6.71 |
| 02103 | 021797 | 109 | $1,798.89 | $1.47 | $ 0.01 | 251 | $ 7.16 |
| 02103 | 022197 | 109 | $850.23 | $1.56 | $ 0.10 | 115 | $ 7.39 |
| 02103 | 022297 | 109 | $1,208.89 | $1.49 | $ 0.03 | 166 | $ 7.28 |
| 02103 | 030397 | 109 | $1,074.33 | $1.73 | $ 0.27 | 114 | $ 9.42 |
| 02103 | 030497 | 109 | $564.86 | $1.37 | ($ 0.09) | 64 | $ 8.82 |
| 02103 | 030597 | 109 | $1,148.80 | $1.65 | $ 0.19 | 121 | $ 9.49 |
| 02103 | 030697 | 109 | $724.36 | $1.55 | $ 0.09 | 94 | $ 7.70 |
| 02103 | 030897 | 109 | $1,394.22 | $1.57 | $ 0.11 | 178 | $ 7.83 |
| 02103 | 030997 | 109 | $1,445.41 | $1.59 | $ 0.13 | 202 | $ 7.15 |
| 02103 | 031197 | 109 | $628.29 | $1.53 | $ 0.07 | 103 | $ 6.09 |
| 02103 | 031397 | 109 | $750.80 | $1.37 | ($ 0.09) | 107 | $ 7.01 |
| 02103 | 031797 | 109 | $852.39 | $1.38 | ($ 0.08) | 114 | $ 7.47 |
| 02103 | 031897 | 109 | $653.46 | $1.38 | ($ 0.08) | 75 | $ 8.71 |
| 02103 | 032097 | 109 | $450.06 | $1.25 | ($ 0.21) | 84 | $ 5.35 |
| 02103 | 032297 | 109 | $1,460.64 | $1.50 | $ 0.04 | 179 | $ 8.16 |
| 02103 | 032597 | 109 | $768.88 | $1.33 | ($ 0.13) | 109 | $ 7.05 |
| 02103 | 032797 | 109 | $898.01 | $1.44 | ($ 0.02) | 107 | $ 8.39 |
| 02103 | 032897 | 109 | $1,069.77 | $1.27 | ($ 0.19) | 135 | $ 7.92 |
| 02103 | 032997 | 109 | $3,370.64 | $1.47 | $ 0.01 | 381 | $ 8.84 |
| 02103 | 040197 | 109 | $1,061.04 | $1.61 | $ 0.15 | 113 | $ 9.38 |
| 02103 | 040397 | 109 | $967.84 | $1.62 | $ 0.16 | 140 | $ 6.91 |
| 02103 | 040597 | 109 | $1,637.47 | $1.50 | $ 0.04 | 225 | $ 7.27 |
| 02103 | 040797 | 109 | $977.98 | $1.50 | $ 0.04 | 115 | $ 8.50 |
| 02103 | 040897 | 109 | $815.40 | $1.68 | $ 0.22 | 116 | $ 7.02 |
| 02103 | 041197 | 109 | $608.66 | $1.46 | $ 0.00 | 79 | $ 7.70 |
| 02103 | 041297 | 109 | $1,528.55 | $1.45 | ($ 0.01) | 191 | $ 8.00 |
|  |  |  |  |  | $ 0.60 |  |  |
| 02103 | 011497 | 117 | $816.95 | $1.62 | $ 0.16 | 90 | $ 9.07 |
| 02103 | 011797 | 117 | $1,016.88 | $1.24 | ($ 0.22) | 150 | $ 6.77 |
| 02103 | 011897 | 117 | $1,385.64 | $1.53 | $ 0.07 | 161 | $ 8.60 |
| 02103 | 012097 | 117 | $555.09 | $1.33 | ($ 0.13) | 111 | $ 5.00 |
| 02103 | 012297 | 117 | $788.21 | $1.90 | $ 0.44 | 90 | $ 8.75 |
| 02103 | 012397 | 117 | $924.22 | $1.65 | $ 0.19 | 112 | $ 8.25 |
| 02103 | 012497 | 117 | $807.19 | $1.61 | $ 0.15 | 110 | $ 7.33 |
| 02103 | 012797 | 117 | $560.00 | $1.75 | $ 0.29 | 69 | $ 8.11 |
| 02103 | 012997 | 117 | $802.55 | $1.33 | ($ 0.13) | 125 | $ 6.42 |
| 02103 | 013097 | 117 | $947.90 | $1.43 | ($ 0.03) | 126 | $ 7.52 |
| 02103 | 013197 | 117 | $1,472.83 | $1.49 | $ 0.03 | 169 | $ 8.71 |
| 02103 | 020397 | 117 | $805.31 | $1.50 | S0.04 | 97 | $ 8.30 |
| 02103 | 020697 | 117 | $1,036.15 | $1.38 | ($ 0.08) | 137 | $ 7.56 |
| 02103 | 020797 | 117 | $1,154.72 | $1.41 | ($ 0.05) | 154 | $ 7.49 |
| 02103 | 021097 | 117 | $670.28 | $1.34 | ($ 0.12) | 106 | $ 6.32 |
| 02103 | 021397 | 117 | $783.14 | $1.66 | S0.20 | 120 | $ 6.52 |
| 02103 | 021497 | 117 | $905.07 | $1.33 | ($ 0.13) | 151 | $ 5.99 |
| 02103 | 021597 | 117 | $1,109.41 | $1.39 | ($ 0.07) | 159 | $ 6.97 |
| 02103 | 021997 | 117 | $816.81 | $1.73 | $ 0.27 | 74 | $11.03 |
| 02103 | 022097 | 117 | $1,110.64 | $1.42 | (S0.04) | 129 | $ 8.60 |
| 02103 | 022197 | 117 | $1,372.93 | $1.56 | $ 0.10 | 166 | $ 8.27 |
| 02103 | 022497 | 117 | $671.20 | $1.60 | $ 0.14 | 97 | $ 6.91 |
| 02103 | 022597 | 117 | $969.84 | $1.63 | $ 0.17 | 113 | $ 8.58 |
| 02103 | 022797 | 117 | $818.36 | $1.47 | $ 0.01 | 95 | $ 8.61 |
| 02103 | 022897 | 117 | $1,143.01 | $1.55 | $ 0.09 | 124 | $ 9.29 |
| 02103 | 030197 | 117 | $1,554.22 | $1.65 | $ 0.19 | 163 | $ 9.53 |
| 02103 | 030797 | 117 | $772.95 | $1.41 | ($ 0.05) | 117 | $ 6.60 |
| 02103 | 030897 | 117 | $1,280.89 | $1.44 | ($ 0.02) | 165 | $ 7.76 |
| 02103 | 031097 | 117 | $746.98 | $1.57 | $ 0.11 | 118 | $ 6.33 |
| 02103 | 031497 | 117 | $904.93 | $1.56 | $ 0.10 | 96 | $ 9.42 |
| 02103 | 031597 | 117 | $2,024.94 | $1.63 | $ 0.17 | 223 | $ 9.08 |
| 02103 | 031997 | 117 | $561.56 | $1.37 | ($ 0.09) | 76 | $ 7.38 |
| 02103 | 032097 | 117 | $927.41 | $1.38 | ($ 0.08) | 136 | $ 6.81 |
| 02103 | 032197 | 117 | $760.14 | $1.29 | ($ 0.17) | 98 | $ 7.75 |
| 02103 | 032497 | 117 | $587.87 | $1.20 | ($ 0.26) | 102 | $ 5.76 |
| 02103 | 032597 | 117 | $1,043.90 | $1.19 | ($ 0.27) | 147 | $ 7.10 |
| 02103 | 032797 | 117 | $1,375.55 | $1.38 | ($ 0.0S) | 197 | $ 6.98 |
| 02103 | 032897 | 117 | $1,516.16 | $1.39 | ($ 0.07) | 182 | $ 8.33 |
| 02103 | 040297 | 117 | $1,102.61 | $1.49 | $ 0.03 | 136 | $ 8.10 |
| 02103 | 040397 | 117 | $1,698.10 | $1.58 | $ 0.12 | 168 | $10.10 |
| 02103 | 040497 | 117 | $1,511.15 | $1.46 | $ 0.00 | 181 | $ 8.34 |
| 02103 | 040897 | 117 | $1,283.59 | $1.61 | $ 0.15 | 155 | $ 8.28 |
| 02103 | 040997 | 117 | $709.97 | $1.40 | ($ 0.06) | 98 | $ 7.24 |
| 02103 | 041097 | 117 | $1,124.01 | $1.51 | $ 0.05 | 155 | $ 7.29 |
| 02103 | 041197 | 117 | $1,313.37 | $1.47 | $ 0.01 | 165 | $ 7.95 |
| 02103 | 020397 | 121 | $1,029.29 | $1.48 | $ 0.02 | 143 | $ 7.19 |

-continued

CASHIER DATABASE - Store #2103

| Store (50) | Date (52) | Cashier (54) | Net (56) | Aver Item (58) | Dev $ (60) | Cust # (62) | Aver Tran (64) |
|---|---|---|---|---|---|---|---|
| 02103 | 020597 | 121 | $812.97 | $1.40 | ($0.06) | 118 | $ 6.88 |
| 02103 | 020997 | 121 | $1,136.31 | $1.49 | $0.03 | 186 | $ 6.10 |
| 02103 | 021097 | 121 | $428.77 | $1.48 | $0.02 | 64 | $ 6.69 |
| 02103 | 021297 | 121 | $595.07 | $1.49 | $0.03 | 74 | $ 8.04 |
| 02103 | 021697 | 121 | $987.80 | $1.51 | $0.05 | 168 | $ 5.87 |
| 02103 | 021897 | 121 | $487.22 | $1.79 | $0.33 | 53 | $ 9.19 |
| 02103 | 022397 | 121 | $1,262.76 | $1.52 | $0.06 | 175 | $ 7.21 |
| 02103 | 022697 | 121 | $870.35 | $1.62 | $0.16 | 104 | $ 8.36 |
| 02103 | 030297 | 121 | $881.34 | $1.41 | ($0.05) | 144 | $ 6.12 |
| 02103 | 031697 | 121 | $1,471.51 | $1.51 | $0.05 | 219 | $ 6.71 |
| 02103 | 032197 | 121 | $1,260.40 | $1.32 | ($0.14) | 164 | $ 7.68 |
| 02103 | 032397 | 121 | $1,244.04 | $1.51 | $0.05 | 209 | $ 5.98 |
| 02103 | 033197 | 121 | $1,758.53 | $1.66 | $0.20 | 221 | $ 7.95 |
| 02103 | 040197 | 121 | $1,435.26 | $1.52 | $0.06 | 143 | $10.03 |
| 02103 | 040297 | 121 | $2,071.45 | $1.58 | $0.12 | 216 | $ 9.77 |
| 02103 | 040497 | 121 | $1,548.56 | $1.56 | $0.10 | 186 | $ 8.32 |
| 02103 | 040597 | 121 | $1,179.81 | $1.45 | ($0.01) | 144 | $ 8.19 |
| 02103 | 040697 | 121 | $1,501.12 | $1.52 | $0.06 | 225 | $ 6.70 |
| 02103 | 040797 | 121 | $1,526.82 | $1.81 | $0.35 | 204 | $ 7.48 |
| 02103 | 040997 | 121 | $1,066.78 | $1.47 | $0.01 | 166 | $ 6.46 |
| 02103 | 041097 | 121 | $533.46 | $1.42 | ($0.04) | 86 | $ 6.20 |
| 02103 | 041297 | 121 | $1,060.83 | $1.44 | ($0.02) | 143 | $ 7.41 |
| 02103 | 041397 | 121 | $1,595.14 | $1.71 | $0.25 | 204 | $ 7.81 |
| 02103 | 011797 | 160 | $762.80 | $1.35 | ($0.11) | 122 | $ 6.25 |
| 02103 | 012197 | 160 | $624.23 | $1.33 | ($0.13) | 103 | $ 6.06 |
| 02103 | 012297 | 160 | $556.58 | $1.19 | ($0.27) | 103 | $ 5.40 |
| 02103 | 012497 | 160 | $925.33 | $1.45 | ($0.01) | 135 | $ 6.85 |
| 02103 | 012697 | 160 | $1,046.92 | $1.56 | $0.10 | 187 | $ 5.59 |
| 02103 | 012897 | 160 | $730.35 | $1.36 | ($0.10) | 109 | $ 6.70 |
| 02103 | 020197 | 160 | $1,647.69 | $1.51 | $0.05 | 173 | $ 9.52 |
| 02103 | 020497 | 160 | $1,058.43 | $1.36 | ($0.10) | 142 | $ 7.45 |
| 02103 | 021197 | 160 | $792.05 | $1.19 | ($0.27) | 160 | $ 4.95 |
| 02103 | 021497 | 160 | $722.66 | $1.17 | ($0.29) | 128 | $ 5.64 |
| 02103 | 021997 | 160 | $752.79 | $1.52 | $0.06 | 129 | $ 5.83 |
| 02103 | 022097 | 160 | $581.58 | $1.36 | ($0.10) | 95 | $ 6.12 |
| 02103 | 022497 | 160 | $944.67 | $1.50 | $0.04 | 117 | $ 8.07 |
| 02103 | 022597 | 160 | $902.00 | $1.42 | ($0.04) | 125 | $ 7.21 |
| 02103 | 022797 | 160 | $771.55 | $1.39 | ($0.07) | 135 | $ 5.71 |
| 02103 | 022897 | 160 | $1,085.23 | $1.54 | $0.08 | 147 | $ 7.38 |
| 02103 | 030397 | 160 | $1,146.12 | $1.65 | $0.19 | 125 | $ 9.16 |
| 02103 | 030597 | 160 | $849.97 | $1.44 | ($0.02) | 125 | $ 6.79 |
| 02103 | 030697 | 160 | $822.58 | $1.43 | ($0.03) | 121 | $ 6.79 |
| 02103 | 030797 | 160 | $1,052.26 | $1.41 | ($0.05) | 165 | $ 6.37 |
| 02103 | 031097 | 160 | $1,202.67 | $1.52 | $0.06 | 165 | $ 7.28 |
| 02103 | 031297 | 160 | $451.00 | $1.26 | ($0.20) | 99 | $ 4.55 |
| 02103 | 031397 | 160 | $928.63 | $1.37 | ($0.09) | 139 | $ 6.68 |
| 02103 | 031497 | 160 | $804.94 | $1.24 | ($0.22) | 115 | $ 6.99 |
| 02103 | 031797 | 160 | $930.04 | $1.15 | ($0.31) ($1.83) | 141 | $ 6.59 |
| 02103 | 011997 | 173 | $1,235.37 | $1.50 | $0.04 | 173 | $ 7.14 |
| 02103 | 022697 | 206 | $276.14 | $1.16 | ($0.30) | 65 | $ 4.68 |
| 02103 | 030197 | 206 | $1,002.16 | $1.29 | ($0.17) | 120 | $ 8.49 |
| 02103 | 030297 | 206 | $375.60 | $1.08 | ($0.38) | 61 | $ 6.58 |
| 02103 | 031597 | 206 | $775.32 | $1.37 | ($0.09) | 85 | $ 9.12 |
| 02103 | 032497 | 206 | $1,326.08 | $1.41 | ($0.05) | 180 | $ 7.36 |
| 02103 | 040197 | 206 | $670.31 | $1.38 | ($0.08) ($1.07) | 70 | $10.15 |
| 02103 | 020297 | 220 | $1,217.41 | $1.43 | ($0.03) | 185 | $ 6.58 |
| 02103 | 020197 | 221 | $1,613.94 | $1.53 | $0.07 | 175 | $ 9.27 |
| 02103 | 020397 | 221 | $244.74 | $1.02 | ($0.44) | 55 | $ 4.70 |
| 02103 | 020897 | 221 | $739.65 | $1.69 | $0.23 | 108 | $ 7.04 |
| 02103 | 021097 | 221 | $731.47 | $1.40 | ($0.06) | 113 | $ 6.64 |
| 02103 | 021897 | 221 | $319.34 | $1.48 | $0.02 | 55 | $ 6.02 |
| 02103 | 030497 | 221 | $735.70 | $1.47 | $0.01 | 93 | $ 7.99 |
| 02103 | 030897 | 221 | $698.12 | $1.49 | $0.03 | 88 | $ 8.95 |
| 02103 | 031597 | 221 | $521.09 | $1.20 | ($0.26) | 85 | $ 6.20 |
| 02103 | 032297 | 221 | $659.92 | $1.54 | $0.08 | 84 | $ 8.04 |
| 02103 | 032897 | 221 | $514.33 | $1.56 | $0.10 | 58 | $ 9.18 |
| 02103 | 032997 | 221 | $1,346.40 | $1.75 | $0.29 | 162 | $ 8.57 |
| 02103 | 040397 | 221 | $545.23 | $1.41 | ($0.05) | 81 | $ 6.99 |
| 02103 | 040597 | 221 | $756.67 | $1.64 | $0.18 $0.20 | 112 | $ 7.07 |

The store number is listed in column 50. Column 52 lists the transaction dates, and column 54 lists the cashier number (index). The net sales of the cashiers are listed in column 56, i.e. total sales minus refunds, payouts, etc. Column 58 lists the daily average item price for the cashier days shown. Columns 60 lists the daily deviation of the cashier from the store average item price during the time period under investigation. The cashier deviation, which is the algebraic sum, is listed at the bottom of each cashier in column 60. It can be seen that the cashier deviation is the sum of the daily deviations in the column above the cashier deviation. Column 62 lists the total number of customers for that day, and column 64 lists the average transaction price per cashier day. The information above is listed for cashiers 101, 106, 109, 117, 121, 160, 173, 206, 220, and 221.

It is noted that the store average item price is calculated by averaging the daily cashier average item prices selected from the data base. Typically, the concept of averaging averages is not thought to be a logical or sound mathematical or statistical operation. However, according to the present invention, it has been found that this operation is critical to the invention and provides reliable results. It was determined that if a cashier was under ringing merchandise, then their average item price would be lower than the average item price of an honest cashier. Because of store variations due to seasonal and geographical variations, it was concluded that a company norm would not be informative, but that a cashier needed to be compared to a store as an individual entity. Use of the average item price versus the average transaction price is also beneficial because cashiers typically know that the average transaction price is being routinely monitored by management. In theory, if a store has all "honest" cashiers, the store average item price should be higher than if the same store had one or more cashiers under ringing during the time period being examined. It was concluded therefore, according to the present invention, that each cashier average item price for any given day needed to be looked at against the store average item price. Calculating a store average price by dividing the total sales, minus any refund or payouts, by the total number of items sold during a period being examined fails to produce reliable charts showing under ringing. It has been found that generating charts which reflect the investigative results calculating the store average price according to the invention produces reliable results. In accordance with the invention, all of the average item prices for each cashier for each day that a cashier qualifies for an exception report, e.g., the cashier had at least 50 customers during a day, is added to arrive at a total. The total of the cashier average item price for each day is then divided by the total number of qualified cashier days or entries in the total. This provides an average item price of a cashier average item price in the above table. This method had been found to provide consistent reliable exception reports indicating under ringing and/or sliding.

Figure 5:
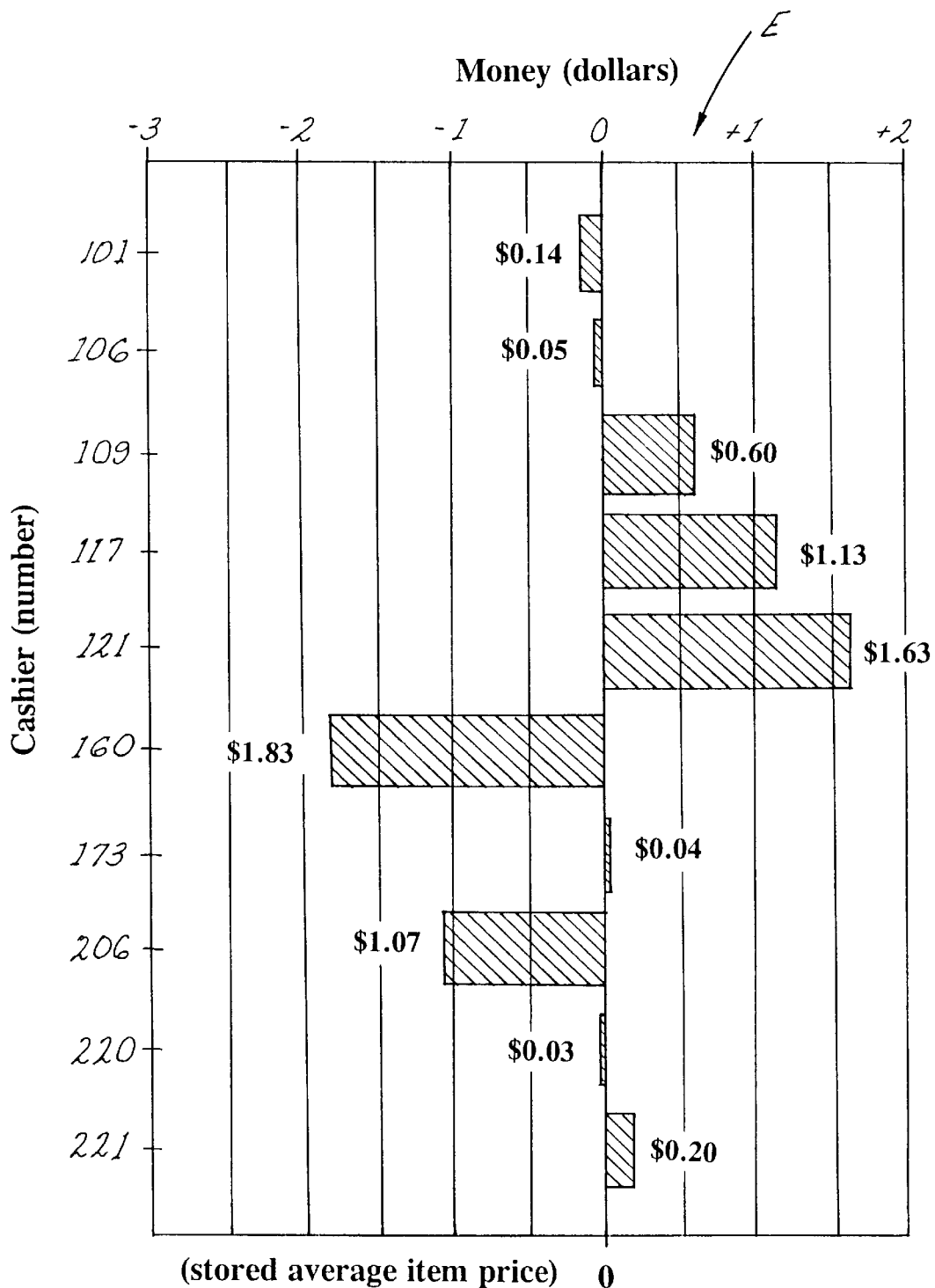
FIG. 5 is a flow diagram illustrating the method and system of the present system for generating a refund graph.

Turning now to FIG. 5, a typical cashier graph E output at 22 according to the invention is illustrated which plots the cashier deviations of the cashiers. From the cashier graph, cashiers 121 and 160 can be identified for possible problems. The cashier deviations of cashier 117 and 206 may also fall outside of the acceptable range of deviation, e.g. 30%. The large negative cashier deviation of cashier 160 indicates under ringing which can be proven or disproved by an audit trail. There will be a paper trail of any under ringing. The large positive cashier deviation of cashier 121 indicates merchandise sliding. If the audit of cashier 160 substantiates under ringing, then it is unlikely the cashier 121 is sliding merchandise. However if the audit shows there is no under ringing by cashier 160, then it is highly likely that cashier 121 is sliding merchandise. Alternately, if there is a very large positive cashier deviation and there is no correspondingly large negative cashier deviation, then the positive cashier deviation would indicate merchandise sliding. A negative or positive cashier deviation outside the norm, e.g., 30% range, will indicate merchandise sliding or over ringing. If they both exist, then the above analyses must be undertaken by store management. If only one exists, then they are a very true indicator of the merchandise sliding or under ringing.

Figure 4:
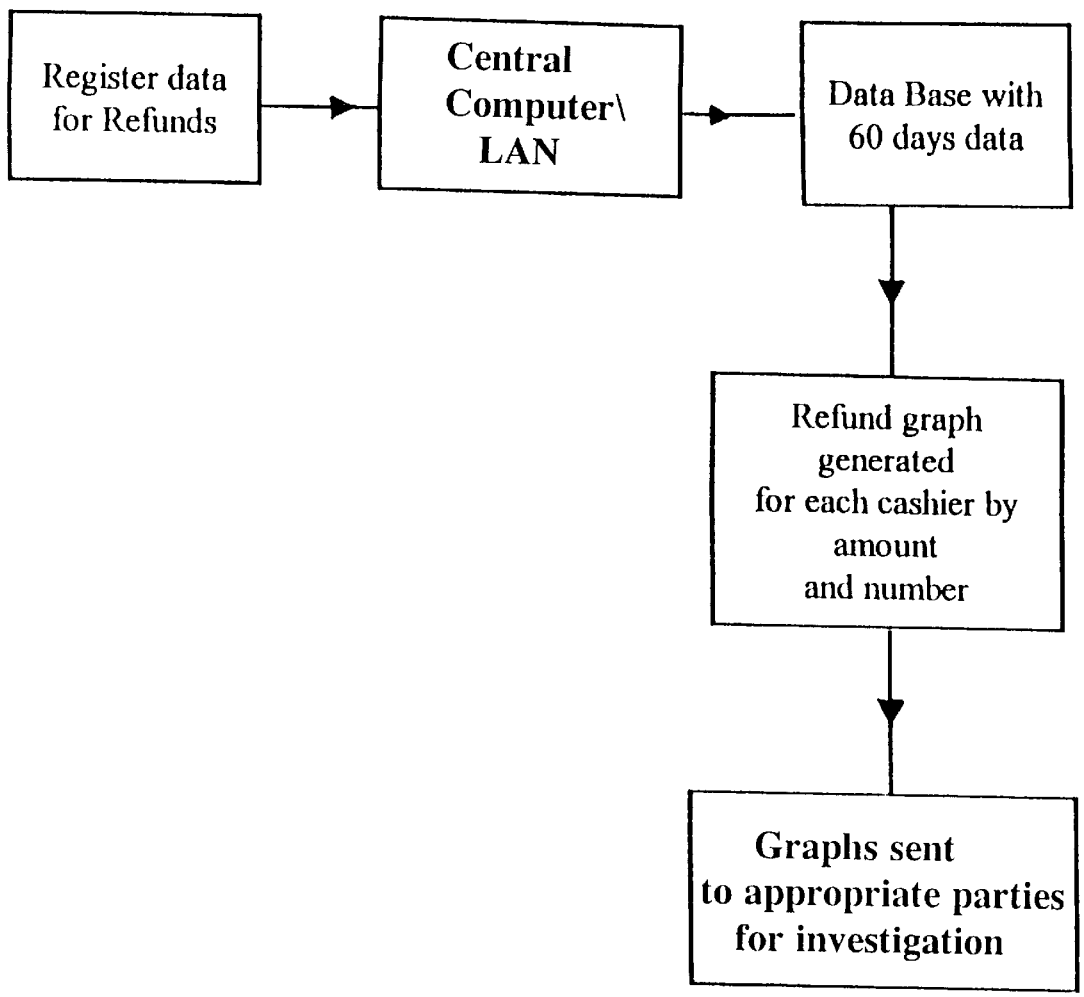
FIG. 4 is a cashier exception report graph according to the invention which graphs the cashier deviation of a plurality of cashier against the store as a zero baseline.
Figure 6:
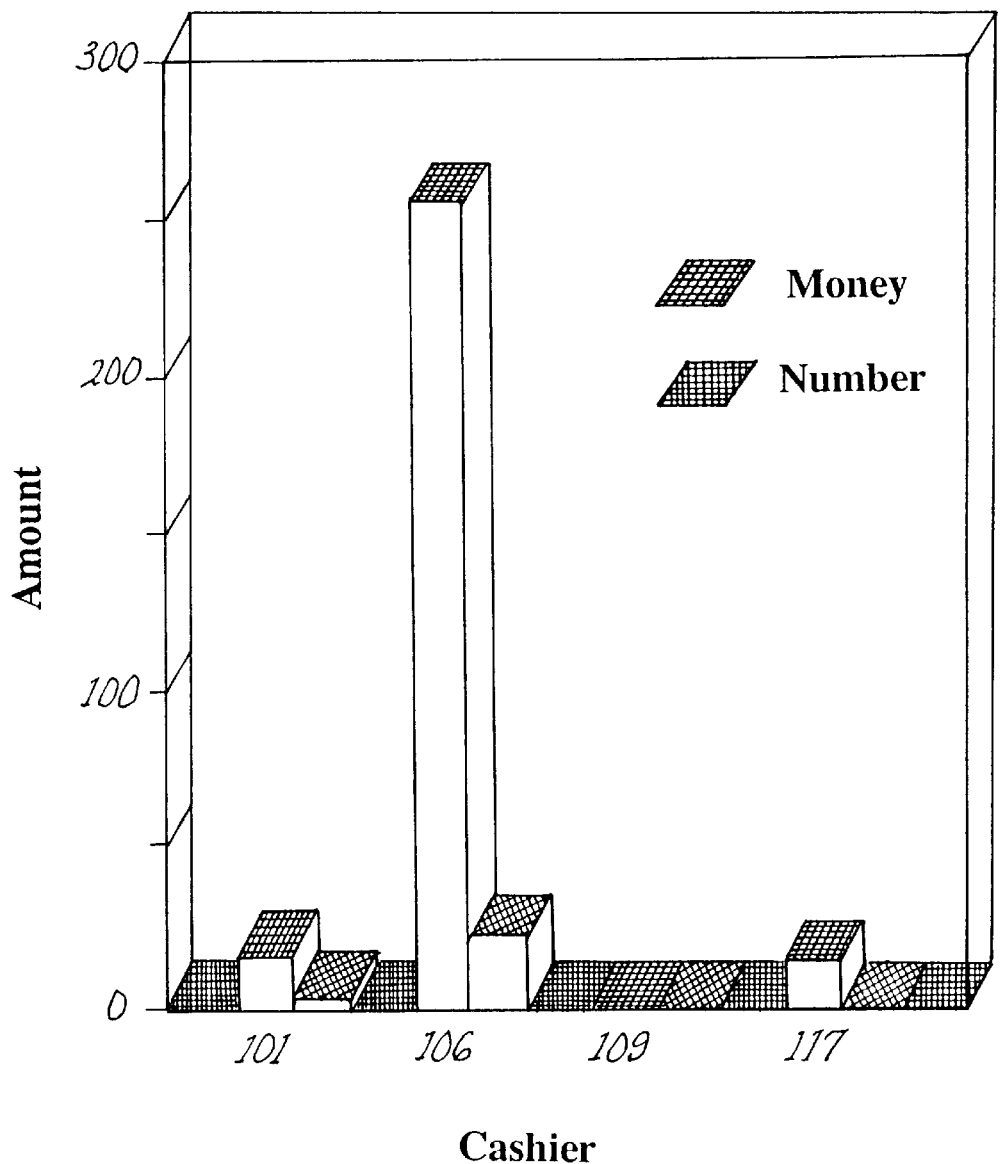
FIG. 6 is a refund graph for the same store as shown in FIG. 5.

FIG. 6 shows a refund chart which may also be calculated by computer B having received refund information in cash register data 10. The refund data chart may also be generated by the computer and printed out for additional information and analyses. The refund graph is important in further highlighting the activities of cashiers when taken along with the deviation data in FIG. 4.

What makes this process unique is that it's against the rules of math to average averages. In here, unless you average the averages, you can't make the system work.

While a preferred embodiment of the invention has been described using specific terms, such description is for illustrative purposes only, and it is to be understood that changes and variations may be made without departing from the spirit or scope of the following claims.

What is claimed is:

1. A computerized method for detecting the under ringing and sliding of merchandise by a cashier in an electronic cash register system employing a plurality of electronic cash registers and a cashier at each cash register, said cash register system compiling raw cash register data which includes the total number of items and dollar amount for all items sold by each cashier for each cashier day the cashier works, said method comprising:

providing a computer;

inputting and storing said cash register data into computer-readable memory;

processing said cash register data on said computer to determine a cashier average item price for each cashier which represents the average price of the items sold by a respective cashier on each day;

indexing said cashier average item price to a respective cashier and storing said cashier average item price for all of said cashiers in a cashier database in a computer-readable medium;

processing said cash register data to determine the store average item price representing the average price of all said items sold by all the cashiers during a specified time period;

comparing said daily cashier average item price and said store average item price to determine the daily deviation of each said cashier from said store average item price;

computing a cashier deviation for each cashier by algebraically summing said daily deviations of each said cashier; and determining if said cashier deviation of an individual cashier is significantly different from the cashier deviation of the other cashiers so that said individual cashier can be identified for further investigation.

2. The method of claim 1 including determining said daily cashier average item price for each cashier day of said cashiers during said specified time period.

3. The method of claim 2 wherein said specified time period is in a range of about 30 to 90 days.

4. The method of claim 3 wherein said specified period of time is approximately 60 days.

5. The method of claim 1 wherein said specified time period is in a range of about 30 to 90 days.

6. The method of claim 5 wherein said specified period of time is approximately 60 days.

7. The method of claim 1 including computing said store average item price by totaling said cashier average item price for each day for each cashier selected during said specified period and dividing the total by the number of entries in the total.

8. The method of claim 1 including displaying said cashier deviation by generating said report by generating a graph containing a plot of said cashier deviation of said cashiers against said store average item price.

9. The method of claim 8 including generating said graph based on a deviation from said store average item price as a zero base line.

10. The method of claim 8 including printing said graph on a computer associated printer.

11. The method of claim 1 including selecting the said cashier data to be processed on said computer according to predetermined criteria.

12. The method of claim 11 wherein said predetermined criteria includes selecting said cashier data indexed to cashiers who have a minimum number of customers per cashier day.

13. The method of claim 1 including conducting a paper audit of a first cashier whose cashier deviation indicates under ringing.

14. The method of claim 13 including identifying a second cashier whose cashier deviation indicates merchandise sliding but concluding that merchandise sliding is unlikely if said audit trail of said first cashier indicates under ringing.

15. The method of claim 13 including investigating a second cashier whose cashier deviation indicate merchandise sliding in the event said audit trail indicates under ringing is not likely.

16. A computer program for controlling a computer in an electronic cash register system to detect the under ringing and sliding of merchandise by a cashier, said cash register system employing a plurality of electronic cash registers with a cashier at each cash register, a computer for receiving and compiling cash register data from said cash registers which includes the total number of items sold and the total dollar sales of the items sold by each cashier on a cashier day on which the cashier is working, and a cash register database for storing said cash register data in a computer-readable medium; said computer program embodied in a computer readable medium comprising:

means embodied in computer-readable code for processing said cash register data to calculate a daily cashier average item price for each cashier per cashier day;

means embodied in computer-readable code for creating a cashier database for storing said cashier average item prices indexed to said cashiers in a computer-readable medium;

means embodied in computer-readable code for processing said cash register data to calculate a store average item price representing the average of all qualifying cashier average item prices during a specified time period;

means embodied in computer-readable code for comparing said daily cashier average item price and said store average item price data to calculate a daily deviation of each cashier from said store average item price;

means embodied in computer-readable code for calculating a cashier deviation of each cashier representing the algebraic sum of said daily deviations of each said cashier; and means embodied in computer-readable code for determining if a cashier deviation of an individual cashier is significantly different from the other cashiers so that said individual cashier can be identified for further investigation.

17. The program of claim 16 including selection instructions embodied in computer-readable code for selecting said cashier data only for cashiers meeting predetermined criteria.

18. The program of claim 17 wherein said means for calculating a store average item price includes instructions embodied in computer-readable code for arriving at a total by adding all of the cashier average item prices for each qualifying cashier for each day in the specified time period and dividing the total by the number of entries in the total.

19. The program of claim 17 wherein said predetermined criteria includes having one of a minimum number of customers during a specified time period.

20. The program of claim 17 wherein said specified time period is in a range of about 30 to 90 days.

21. The program of claim 20 wherein said specified period of time is approximately 60 days.

22. The program of claim 17 including means embodied in computer-readable code for generating a visual report which can be displayed.

23. The program of claim 22 including means embodied in computer-readable media for generating a graph containing a plot of said cashier deviations of said cashiers against said store average item price.

24. A system for detecting the under ringing and sliding of merchandise by a cashier in a retail establishment comprising:

an electronic cash register system employing a plurality of electronic cash registers and a cashier at each cash register, said cash register system compiling raw cash register data which includes the total number of items sold and dollar sales of the items sold by each cashier on each cashier day a cashier works;

a cash register database for storing said cash register data in a computer-readable medium;

a central computer for processing said cash register data;

means embodied in computer-readable code including averaging instructions for processing said cash register data on said computer to determine a daily cashier average item price representing a daily average price of the items sold by each cashier per cashier day and a store average item price representing the average of all qualifying cashier average item prices during a specified time period;

a cashier database including said daily cashier average item prices in computer-readable form indexed to said cashiers stored in a computer-readable medium;

comparative instructions embodied in computer-readable form for comparing said daily cashier average item price for each said cashier and said store average item price to determine a daily deviation of each said cashier from said store average item price, and for calculating a total cashier deviation for each cashier by algebraically summing of said daily deviations of each said cashier; and means embodied in computer-readable codes for generating a report to identify if a cashier deviation of an individual cashier is significantly different from the other cashiers so that said individual cashier can be identified for further investigation.

25. The system of claim 24 wherein said specified time period is in a range of about 30 to 90 days.

26. The system of claim 25 wherein said specified period of time is approximately 60 days.

27. The system of claim 24 wherein said averaging instructions include means embodied in said computer-readable code for determining said daily cashier average item price sold by each cashier per cashier day by dividing said dollar sales by said number of items.

28. The system of claim 24 wherein said averaging instructions include means embodied in computer-readable code for determining said store average item price by adding all the cashier average item prices of each qualifying cashier and then dividing by the total number of cashier days during said specified time period.

29. The system of claim 28 wherein said specified time period is in a range of about 30 to 90 days.

30. The system of claim 29 wherein said specified period of time is approximately 60 days.

31. The system of claim 25 wherein said averaging instructions include means embodied in computer-readable code for determining said daily cashier average item price for each cashier day of each said cashier during said specified time period.

32. The system of claim 24 includes a visual report generated on said computer for displaying said cashier deviation of said cashiers.

33. The system of claim 32 wherein said report includes a graph containing a plot of said cashier deviation of said cashier against said store average item price as a zero base line.

34. The system of claim 33 wherein said graph is in print form.

35. The system of claim 24 including selection instructions embodied in computer-readable media for selecting said cashier data to be processed on said computer according to predetermined criteria.

36. The system of claim 35 wherein said predetermined criteria includes selecting the cashier data of only cashiers who have worked a minimum number of customers per cashier day during said specified time period.

* * * * *